United States Patent [19]
Scherf

[11] Patent Number: 5,928,734
[45] Date of Patent: Jul. 27, 1999

[54] SOFT TRIM PART FOR THE INTERIOR FINISHING OF, IN PARTICULAR, MOTOR VEHICLES AND METHOD FOR THE MANUFACTURE OF A SOFT TRIM PART

[75] Inventor: Ansgar Scherf, Icking, Germany

[73] Assignee: EMPE Findlay Industries GmbH, Gerestried, Germany

[21] Appl. No.: 08/666,553

[22] PCT Filed: Oct. 11, 1995

[86] PCT No.: PCT/DE95/01426

§ 371 Date: Sep. 18, 1996

§ 102(e) Date: Sep. 18, 1996

[87] PCT Pub. No.: WO96/14223

PCT Pub. Date: May 17, 1996

[30] Foreign Application Priority Data

Jan. 5, 1995 [DE] Germany .................. 195 00 233

[51] Int. Cl.$^6$ .................. B60R 13/00; D04H 1/16
[52] U.S. Cl. .................. 428/31; 428/282
[58] Field of Search .................. 264/45.4, 46.4; 428/282, 31

[56] References Cited

U.S. PATENT DOCUMENTS 4,769,278  9/1988  Kamimura et al. .................. 428/282
5,474,841  12/1995  Matsuki et al. .................. 428/304.4
5,476,618  12/1995  Ito et al. .................. 264/45.4

FOREIGN PATENT DOCUMENTS 0 586 908  3/1994  European Pat. Off. .
0 591 533  4/1994  European Pat. Off. .

OTHER PUBLICATIONS

*Patent Abstracts of Japan*, vol. 8, No. 9 (M–268), Jan. 14, 1984—JPA 58–171923 (Oct. 8, 1983).

Primary Examiner—Eggerton A. Campbell
Attorney, Agent, or Firm—Hill & Simpson

[57] ABSTRACT

A soft trim part is provided which is particularly suitable for an automobile interior dashboard or armrest. The trim part includes a core part made of expanded polypropylene ("EPP") to which a decorative layer (made of fabric and/or foil) is fused. To manufacture such a trim part, an edge zone of the EPP core part is heated above a melting temperature and the decorative layer is applied and pressed thereon, fusing the decorative layer to the EPP core part. The fused area cools to form a skin-like carrier layer which is relatively stiff and solid, holding the decorative layer to the core part.

24 Claims, 2 Drawing Sheets

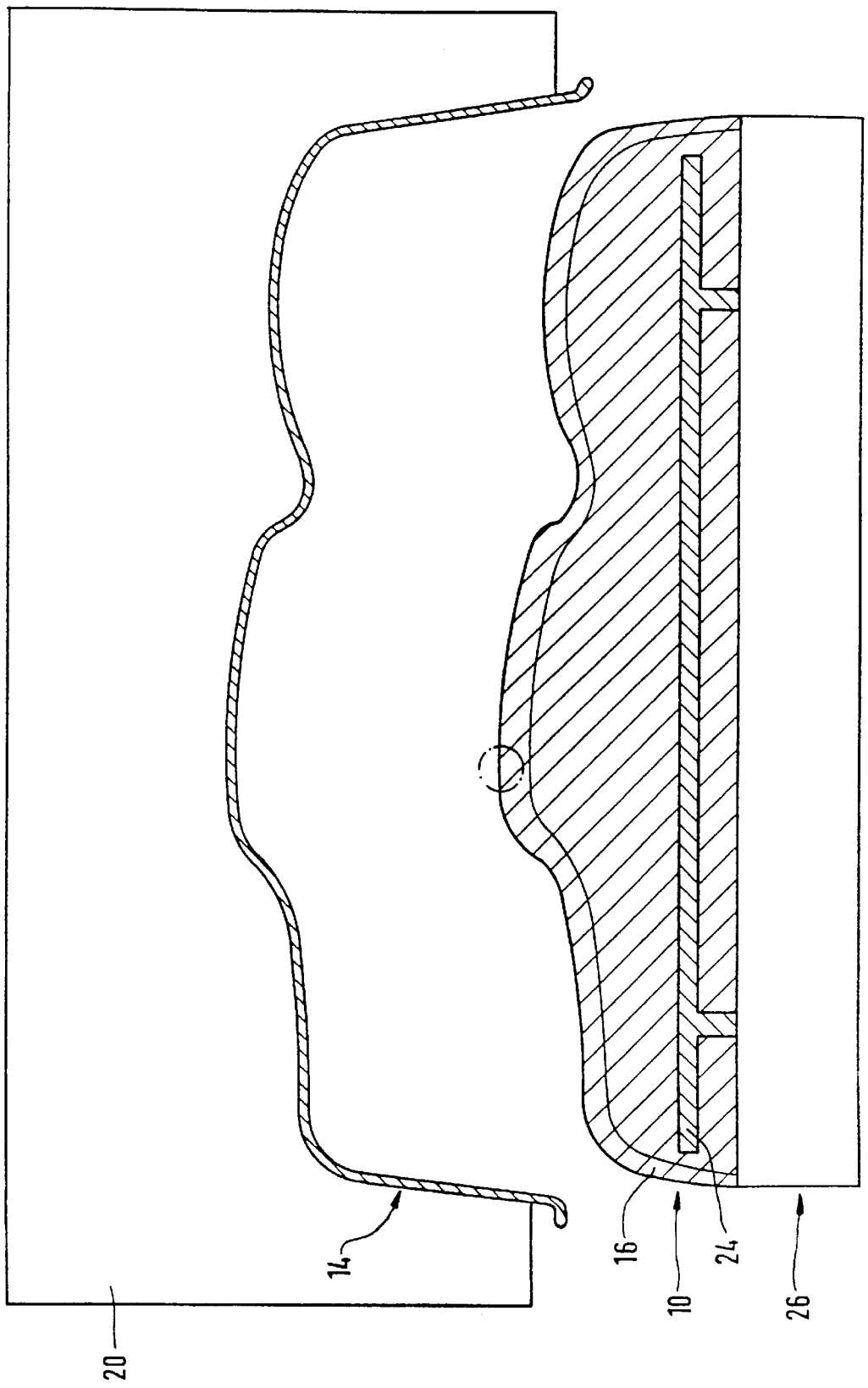

SOFT TRIM PART FOR THE INTERIOR FINISHING OF, IN PARTICULAR, MOTOR VEHICLES AND METHOD FOR THE MANUFACTURE OF A SOFT TRIM PART

BACKGROUND OF THE INVENTION

The invention is directed to a soft trim part which is particularly suited for the interior finishing of motor vehicles. The invention is also directed to a method for manufacturing such a soft trim part.

A conventional soft trim part is manufactured of two parts, i.e. of a crash pad and of a soft trim, whereby the soft trim is composed of a carrier material and of a decorative material such as, for example, fabric applied thereon. Such a soft trim part has the disadvantages that the carrier material differs from the material of the crash pad, must be separately manufactured and a laminating glue is also required for the application of the decorative material. Over and above this, at least two steps are needed for laminating decorative material on such a soft trim part. Therefore, an object of the invention is to provide a soft trim part wherein; a single plastic and no laminating adhesive is required in addition to the decorative material and, potentially, one or more clad, foam-covered fastening carriers. A further object underlying the invention is to provide a method for the manufacture of such a soft trim part.

This object is inventively achieved by a soft trim part of the species for the interior finishing of, in particular, motor vehicles that comprises an EPP formed part that is manufactured of a material composed of expanded polypropylene (EPP) balls, a decorative material, particularly fabric and/or foil, and, potentially, one or more clad, foam-covered fastening carriers, whereby a stiff, pressed, solid, skin-like carrier layer is fashioned on that side of the EPP formed part facing toward the decorative material, the decorative material being held without additional adhesive on said carrier layer, forming a unit with the EPP formed part.

It can thereby be provided that the specific weight of the EPP material amounts to between 24 kg/m$^3$ and 90 kg/m$^3$.

The specific weight of the material preferably amounts to 70 kg/m$^3$.

It can also be provided that the density of the pressed, solid carrier layer amounts to about 500–900 kg/m$^3$, preferably 800 kg/m$^3$.

In a preferred embodiment of the invention, the thickness of the pressed, solid carrier layer amounts to between 0.1 and 1.5 mm and preferably amounts to 1.0 mm.

The object with respect to the method, further, is inventively achieved by the following method steps: 1. heating a defined edge zone of the EPP formed part, and 2. applying and pressing the decorative material onto the heated edge zone.

It can thereby be provided that the thickness of the edge zone amounts to between 1 and 30 mm.

The edge zone preferably amounts to 10 mm.

It can also be provided that the edge zone is heated to a temperature of between 150 and 200° C. and, preferably, to a temperature of 180° C.

It can be provided over and above this that the edge zone is heated over a duration of between 2 and 60 sec.

SUMMARY OF THE INVENTION

The objects are inventively achieved by providing a soft trim part having an expanded polypropylene ("EPP") core part made of expanded polypropylene balls, and a decorative material, such as fabric and/or foil. According to an aspect of the invention, a stiff, pressed, solid, skin-like carrier layer is formed on a side of the EPP core part facing the decorative material which fuses the EPP material to the decorative layer. This carrier layer unitarily bonds the decorative material to the EPP core material, eliminating a need for additional adhesive to hold the carrier layer against the EPP. Also, in an embodiment, the trim part also includes one or more clad, foam-covered fastening carriers. The trim part is particularly suitable for outfitting an automotive interior.

In an embodiment, the EPP material has a specific weight of between about 24 kg/m$^3$ and 90 kg/m$^3$. Preferably, the specific weight is about 70 kg/m$^3$.

In an embodiment, the solid carrier layer has a density of between about 500 to 900 kg/m$^3$, preferably being around 800 kg/m$^3$. Also in a preferred embodiment, the carrier layer has a thickness of between about 0.1 and 1.5 mm, and most preferably around 1.0 mm.

Moreover, the invention provides a method for manufacturing a trim part. According to the method, the EPP formed core part is heated along an edge zone, then the decorative material is applied and pressed onto the heated edge zone. This edge may be between 1 mm and 30 mm wide, and is preferably around 10 mm wide.

In an embodiment, the heating step heats the edge zone to a temperature of between about 150° C. to 200° C., and preferably to about 180° C. This heating may take place for a duration of 2 to 60 seconds, but preferably on the order of about 10 seconds. One or more radiant heaters may be used to heat the edge zone.

The decorative material may be applied onto the heated edge zone with a non-heated laminating die which presses the decorative material against the EPP core part. In an embodiment, the decorative material is held in the laminating die with a vacuum. The decorative material also may be held to the non-heated laminating die with a tentering frame.

Finally, after cooling, the pressed, solid carrier layer has a thickness of about 0.1 to 1.5 mm, and preferably about 1.0 mm.

The invention provides a trim part (such as a dash board, arm rest, etc.) which has advantageous safety properties through the use of the generally soft EPP formed part. The stiff, pressed, solid, skin-like carrier layer is disposed on a side of the EPP formed part facing the decorative material. The result is a one-piece soft trim part having an integrated crash pad. The trim part according to the present invention meets the safety requirements just as conventional one-piece or multiple-piece trim parts.

The trim part is primarily constructed of a single, lightweight plastic (e.g., EPP), except for the decorative and carrier layers. A resulting advantage is that the trim part is light weight, which is important for automobile performance and fuel economy.

Another advantage is that the trim part may be more easily and cost-effectively recycled since it is made primarily from one material, than conventional trim parts having multiple components made of different materials which must be separated for recycling.

The inventive method described herein is known as a "one-step" lamination which results in reduced manufacturing time and expenses.

Additional features and advantages of the present invention are described in, and will be apparent from, the detailed description of the preferred embodiments and from the drawings.

BRIEF DESCRIPTION OF THE DRAWINGS

FIG. 1 is a schematic sectional view of a trim part according to the present invention having an integrated crash pad shown with an associated laminating die and tentering frame, as used during manufacturing.

DETAILED DESCRIPTION OF THE PREFERRED EMBODIMENTS

Figure 2A:
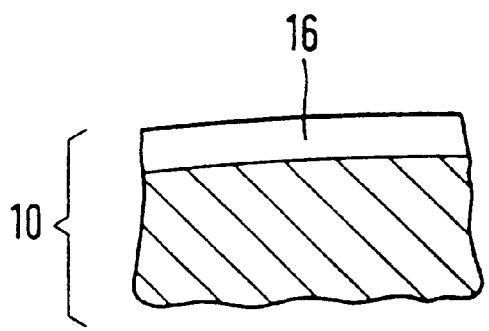
FIGS. 2A and 2B are enlarged fragmentary sectional views of the portion of FIG. 1 generally indicated by a circle, FIG. 2A showing the arrangement of layers at a side of the EPP formed part facing the decorative layer, FIG. 2B showing the layers in a finished, fused-together condition.

FIG. 1 shows an EPP formed part 10 of EPP balls with a clad, foam-covered fastening carrier 24 that is held in an appropriate, non-heated receptacle 26. A non-heated laminating die 20 that holds a decorative material 14 with a vacuum is located above the EPP formed part 10. The decorative material 14 can also be held with the assistance of a tentering frame 22 (not shown).

Figure 2B:
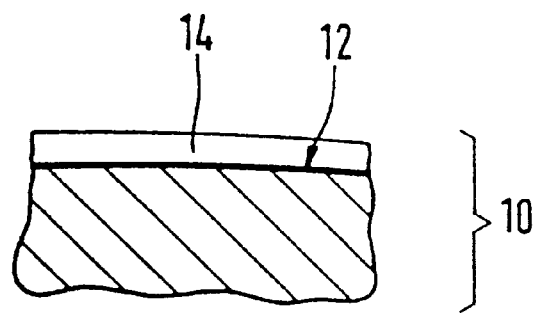

FIGS. 2A and 2B show an enlarged portion (identified in FIG. 1 with a circle) of the layers in a region of a side of the EPP formed part facing toward the decorative material. In FIG. 2A, reference character 16 identifies a defined edge zone 16 that is heated with at least one radiant heater 18 (not shown) up into a defined layer thickness before a non-heated laminating die 20 is moved in the direction of the EPP formed part 10. The heating of the defined edge zone 16 effects a melting of the material composed of EPP balls and results in a pressed, solid carrier layer 12 as shown in FIG. 2B. The decorative material 14 is simultaneously applied onto this pressed, solid carrier layer 12 with the non-heated laminating die 20 and is pressed against the EPP formed part 10 to a nominal size. By subsequent cooling, the pressed, solid carrier layer 12 becomes a resistant, stiff skin that assumes the carrier function of a traditional, separate carrier material. The decorative material 14 forms a unit with the EPP formed part 10 and is firmly held thereon.

As a result thereof that the carrier function is integrated in the EPP soft trim part, only one plastic is present in addition to the decorative material and, potentially, one or more clad, foam-covered fastening carriers. The soft trim part thus becomes lighter and can be recycled in a simple way, i.e. without sorting.

Various changes and modifications to the presently preferred embodiments will be apparent to those skilled in the art. Such changes and modifications may be made without departing from the spirit and scope of the present invention and without diminishing its attendant advantages. Therefore, the appended claims are intended to cover such changes and modifications.

What is claimed is:

1. A soft trim part for an automobile interior, the soft trim part comprising:

an EPP core part made of expanded polypropylene balls;

a decorative layer; and a stiff skin-like carrier layer formed on a side of the EPP core part facing the decorative layer, the decorative layer being unitarily fused to the EPP core part at the carrier layer during formation of the carrier layer.

2. The trim part according to claim 1, wherein the expanded polypropylene has a specific weight between 24 kg/m$^3$ and 90 kg/m$^3$.

3. The trim part according to claim 2, wherein the expanded polypropylene has a specific weight of about 70 kg/m$^3$.

4. The trim part according to claim 1, wherein the carrier layer has a density between about 500–900 kg/m$^3$.

5. The trim part according to claim 4, wherein the density of the carrier layer is about 800 kg/m$^3$.

6. The trim part according to claim 1, wherein the carrier layer has a thickness between 0.1 and 1.5 mm.

7. The trim part according to claim 6, wherein the thickness of the carrier layer is about 1.0 mm.

8. A method for manufacturing a soft trim part, the method comprising the steps of:

(a) heating a defined edge zone on a surface of a core part made of expanded polypropylene balls so that said expanded polypropylene melts at said zone to form a densified carrier layer; and (b) applying and pressing a decorative material onto the heated edge zone so that the decorative layer fuses to said zone as said carrier layer is formed.

9. The method according to claim 8, wherein the edge zone has a thickness between 1 and 30 mm.

10. The method according to claim 9, wherein the edge zone has a width of about 10 mm.

11. The method according to claim 8, wherein the edge zone is heated to a temperature between 150 and 200° C.

12. The method according to claim 11, wherein the edge zone is heated to a temperature of 180° C.

13. The method according to claim 8, wherein the edge zone is heated over a duration of between 2 and 60 sec.

14. The method according to claim 13, wherein the edge zone is heated for about 10 sec.

15. The method according to claim 8, wherein the heating is performed by at least one radiant heater.

16. The method according to claim 8, wherein the applying and pressing of the decorative material is performed with a non-heated laminating die.

17. The method according to claim 16, further comprising the step of drawing into and holding the decorative material in the non-heated laminating die via a vacuum prior to said applying and holding.

18. The method according to claim 16, further comprising the step of holding the decorative material in the non-heated laminating die with a tentering frame prior to said applying and holding.

19. The method according to claim 8, wherein the carrier layer is formed by a melting of the core part, the carrier layer having a thickness after cooling of between 0.1 and 1.5 mm.

20. The method according to claim 19, wherein the thickness of the carrier layer after cooling is about 1.0 mm.

21. The trim part according to claim 1, wherein the decorative layer includes one or more clad, foam-covered fastening carriers.

22. The trim part according to claim 1, wherein the decorative layer includes fabric.

23. The trim part according to claim 1, wherein the decorative layer includes foil.

24. The trim part according to claim 1, wherein the decorative layer being unitarily fused to the EPP core part holds the decorative layer relative to the EPP core part without additional adhesive.

* * * * *